(12) United States Patent
Tivelli

(10) Patent No.: US 8,567,438 B2
(45) Date of Patent: Oct. 29, 2013

(54) QUICK COUPLING WITH SAFETY CATCH DEVICE

(75) Inventor: Sergio Tivelli, Cividate al Piano (IT)

(73) Assignee: STUCCHI S.p.A., Brignano Gera d'Adda (BG) (IT)

( * ) Notice: Subject to any disclaimer, the term of this patent is extended or adjusted under 35 U.S.C. 154(b) by 435 days.

(21) Appl. No.: 12/851,052

(22) Filed: Aug. 5, 2010

(65) Prior Publication Data

US 2011/0030825 A1  Feb. 10, 2011

(30) Foreign Application Priority Data

Aug. 7, 2009 (IT) .............................. MI2009A1454

(51) Int. Cl.
*E03B 1/00* (2006.01)
*F16L 37/32* (2006.01)
*F16L 55/00* (2006.01)
*F16J 15/00* (2006.01)

(52) U.S. Cl.
USPC ........................... 137/614.04; 285/86; 285/91

(58) Field of Classification Search
USPC ........ 137/614.03, 614.04; 285/82, 84, 85, 86, 285/91, 401, 402
See application file for complete search history.

(56) References Cited

U.S. PATENT DOCUMENTS

| | | | | |
|---|---|---|---|---|
| 1,857,420 A * | 5/1932 | Wolford | ............................ | 285/85 |
| 2,450,527 A * | 10/1948 | Smith et al. | ....................... | 285/85 |
| 2,709,093 A * | 5/1955 | Zeeb | ................................. | 285/1 |
| 2,948,553 A | 8/1960 | Gill et al. | | |
| 3,224,728 A * | 12/1965 | Buseth et al. | .............. | 251/149.6 |
| 3,276,474 A * | 10/1966 | Gill | .......................... | 137/614.03 |
| 3,283,780 A * | 11/1966 | Sutton | ....................... | 137/614.04 |
| 3,625,251 A * | 12/1971 | Nelson | ....................... | 137/614.04 |
| 5,184,851 A * | 2/1993 | Sparling et al. | .................. | 285/79 |
| 6,106,026 A * | 8/2000 | Smith, III | ........................ | 285/85 |
| 6,179,001 B1 * | 1/2001 | Schutz | ....................... | 137/614.03 |
| 6,382,680 B1 * | 5/2002 | Horimoto | ........................ | 285/81 |
| 6,799,605 B1 * | 10/2004 | Van Scyoc et al. | ....... | 137/614.03 |
| 7,530,607 B2 * | 5/2009 | Luft | ............................... | 285/402 |
| 7,674,064 B2 * | 3/2010 | Nakamura et al. | ............. | 403/348 |

FOREIGN PATENT DOCUMENTS

| | | |
|---|---|---|
| EP | 0 542 342 A1 | 5/1993 |
| EP | 0 580 233 B1 | 3/1996 |
| EP | 0 686 800 B1 | 4/1999 |
| EP | 0 744 522 B1 | 6/2000 |
| EP | 0 932 791 B1 | 6/2002 |
| WO | 2008/130311 | 10/2008 |

OTHER PUBLICATIONS

Search Report and Written Opinion issued Apr. 20, 2010 in corresponding Italian Application No. MI20091454.

* cited by examiner

*Primary Examiner* — John Rivell
*Assistant Examiner* — Frederick D Soski
(74) *Attorney, Agent, or Firm* — Wenderoth, Lind & Ponack, L.L.P.

(57) ABSTRACT

A quick coupling includes a first element and a second element which may be separably coupled. The first element includes a connector for connecting to a user interface, an external sleeve having helicoidal grooves and seats, and a first valved coupling for a first pressure line. The second element includes a hooking ring nut, a plurality of internal pins, a compression spring, a second valved coupling for a second pressure line, and a connector. The second element further comprises a safety ring nut and a plurality of safety pins provided along a circumference of the safety ring nut, the safety pins being configured to axially slide with the safety ring nut. The safety pins are configured to be pushed by the hooking ring nut and the compression spring into the seats of the external sleeve.

7 Claims, 11 Drawing Sheets

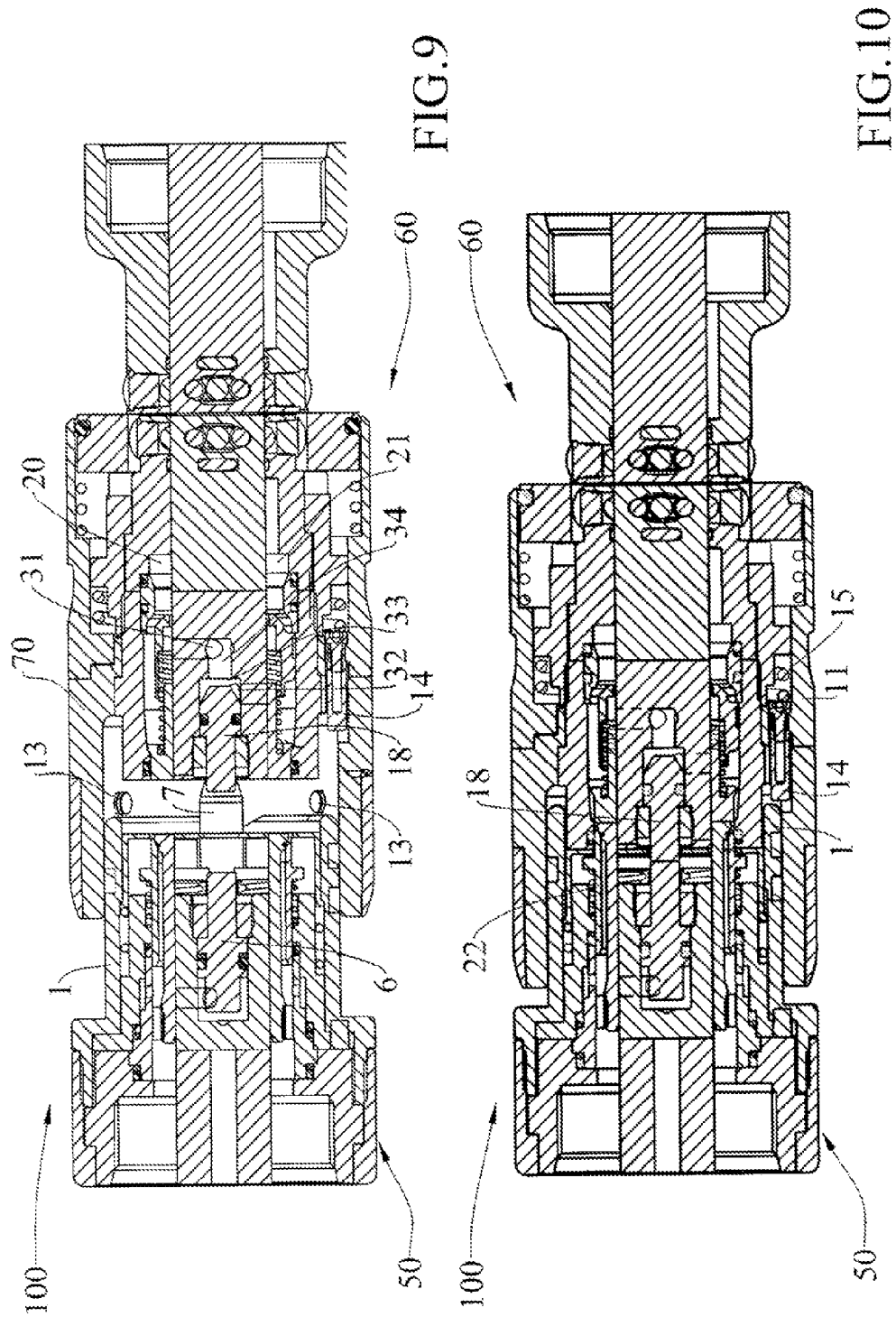

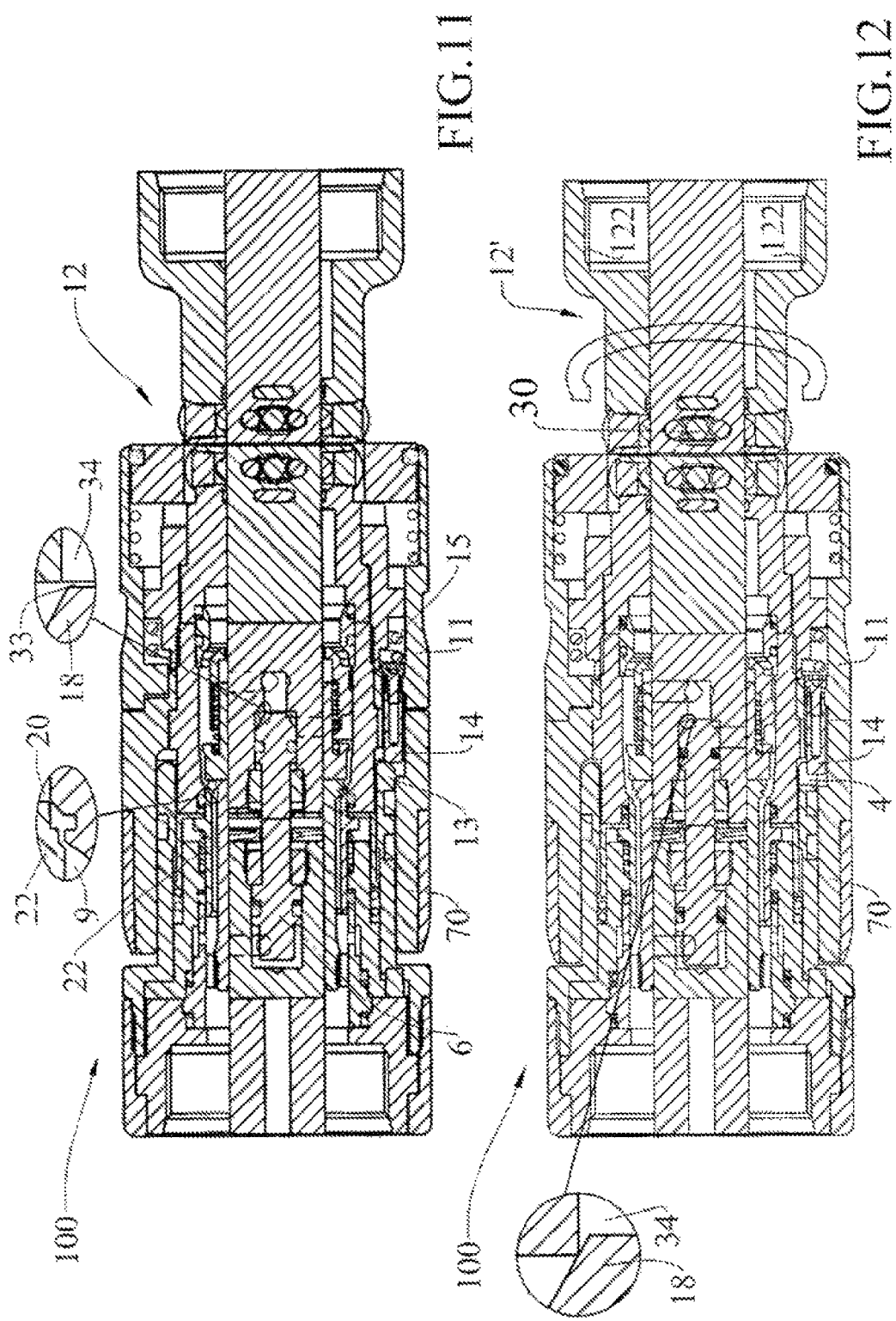

QUICK COUPLING WITH SAFETY CATCH DEVICE

BACKGROUND OF THE INVENTION (1) Field of the Invention

The present invention relates to a quick coupling with safety catch device.

(2) Description of Related Art

A quick coupling consisting of a first element and a second element which may be separably coupled is known.

Externally, the first element is mainly formed by an external sleeve and a connector. The external sleeve is provided with a hooking system with three helicoidal grooves. The connector has two threaded outlets for users interface (tube, control unit, etc.).

Internally, the first element is mainly formed by two valved couplings misaligned with each other and at least one guide pin.

The valved couplings are inserted one into a pressure line and the other into the exhaust line and serve the function of closing the flow when the coupling is uncoupled and open it when the coupling is coupled.

The guide pin allows the centering with the second element during the step of hooking.

Externally, the second element is mainly formed by a hooking ring nut, a safety ring nut and a connector. The hooking ring nut has three radially fixed pins which allow the second element to couple with the first element, by engaging the helicoidal grooves and due to the rotation of the ring nut.

Internally, the second element is mainly formed by two valved couplings misaligned with each other and at least one seat for the guide pin.

The valved couplings are inserted one into a pressure line and the other into the exhaust line and serve the function of closing the flow when the coupling is uncoupled and open it when the coupling is coupled.

The seat accommodates the guide pin of the first element allowing the centering with the first element during the step of hooking.

Examples of known couplings are described in patents EP-0744522, EP-0932791, EP-0542342, EP-0580233 and EP-0686800, all to the Applicant.

BRIEF SUMMARY OF THE INVENTION

It is an object of the present invention to provide a quick coupling consisting of a first element and a second element with a safety device associated with known hooking systems of the type described above.

In accordance with the invention, such an object is achieved by a quick coupling comprising a first element and a second element which may be separably coupled, the first element mainly including an external sleeve with hooking means, a connector for user interface, and at least a valved coupling for at least one pressure line, the second element mainly including hooking means, at least one valved coupling for at least one pressure line, and a connector for user interface, characterized in that said second element also comprises a safety ring nut along the circumference of which safety pins are provided, adapted to be pushed by said hooking means into the seats of the external sleeve.

BRIEF DESCRIPTION OF THE DRAWING

These and other features of the present invention will become further apparent from the following detailed description of a practical embodiment thereof shown by way of non-limitative example in the accompanying drawings, in which:

FIG. 9 shows a section view of the first and second elements aligned in a first position;
FIG. 10 shows a section view of the first and second elements aligned in a second position;
FIG. 11 shows a section view of the first and second elements aligned in a third position;
FIG. 12 shows a section view of the first and second elements aligned in a fourth position.

DETAILED DESCRIPTION OF THE INVENTION

Figure 1:
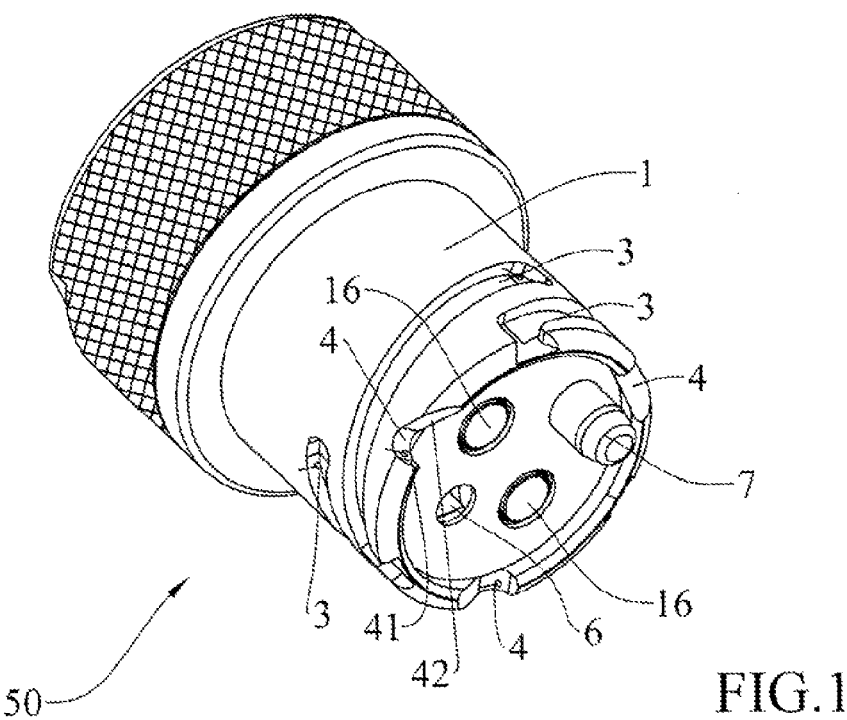
FIG. 1 shows a perspective view of the first element of the coupling.
Figure 2:
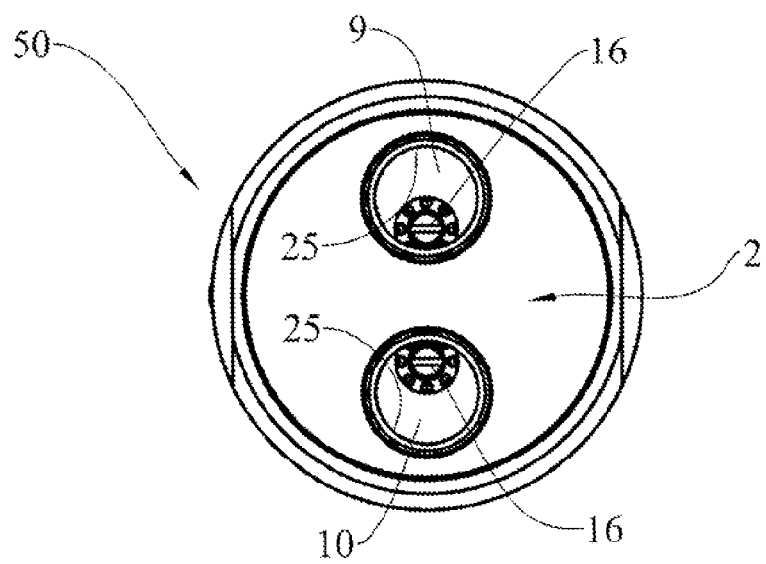
FIG. 2 shows a left-hand view from of FIG. 4.
Figure 3:
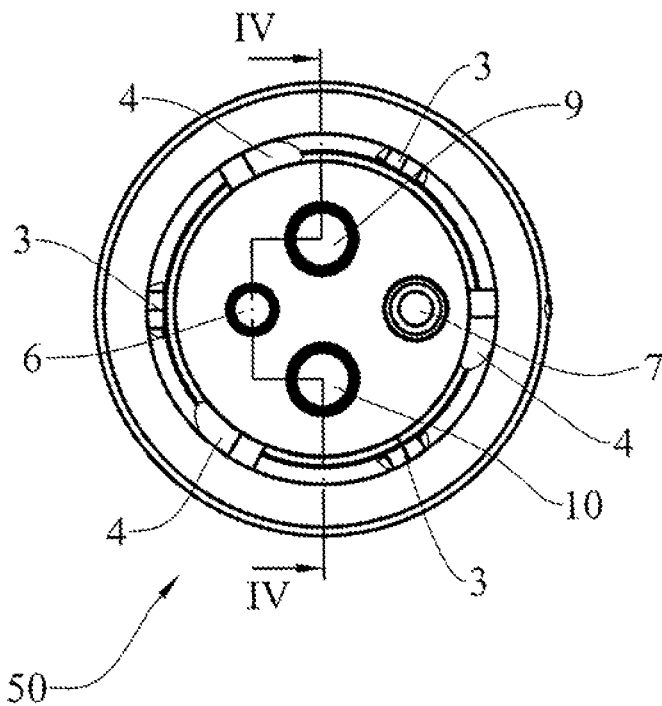
FIG. 3 shows a right-hand view of FIG. 4.

The figures show a quick coupling 100 consisting of a first element 50 and a second element 60.

Externally, the first element 50 (FIGS. 1-4) is mainly formed by an external sleeve 1 and a connector 2. The external sleeve 1 is provided with a hooking system with three helicoidal grooves 3 and three front seats 4 for a safety device. The connector 2 has two threaded outlets 25 for user interface (tube, control unit, etc.).

Internally, the first element 50 is mainly formed by two valved couplings 16 misaligned with each other, a shutter 6 and a guide pin 7.

The valved couplings 16 are inserted one into a pressure line 9 and the other in the exhaust line 10 and serve the function of closing the flow when the coupling is uncoupled and opening it when the coupling is coupled.

Figure 4:
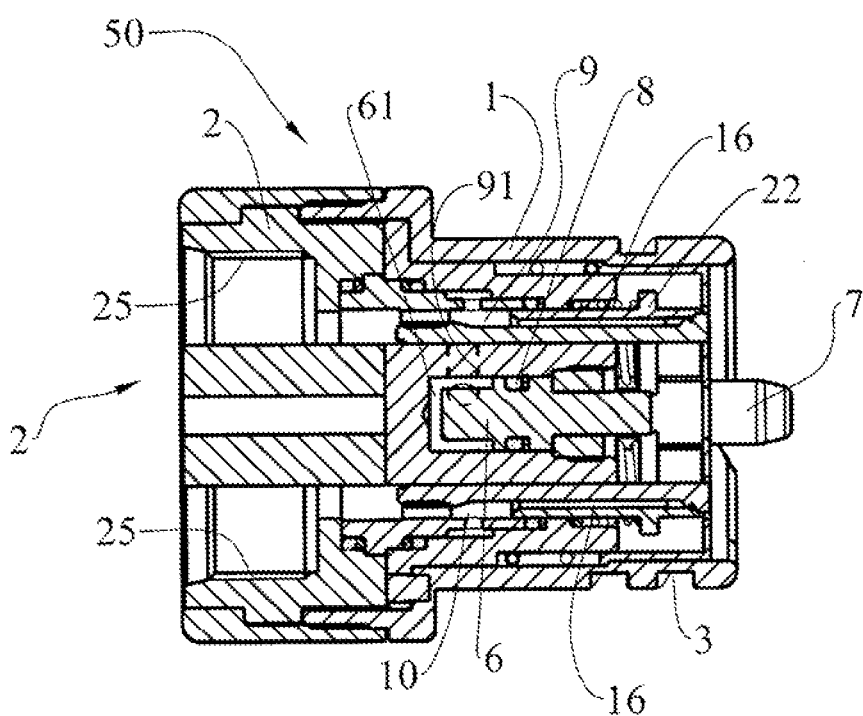
FIG. 4 shows a section view taken along line IV-IV in FIG. 3.
Figure 5:
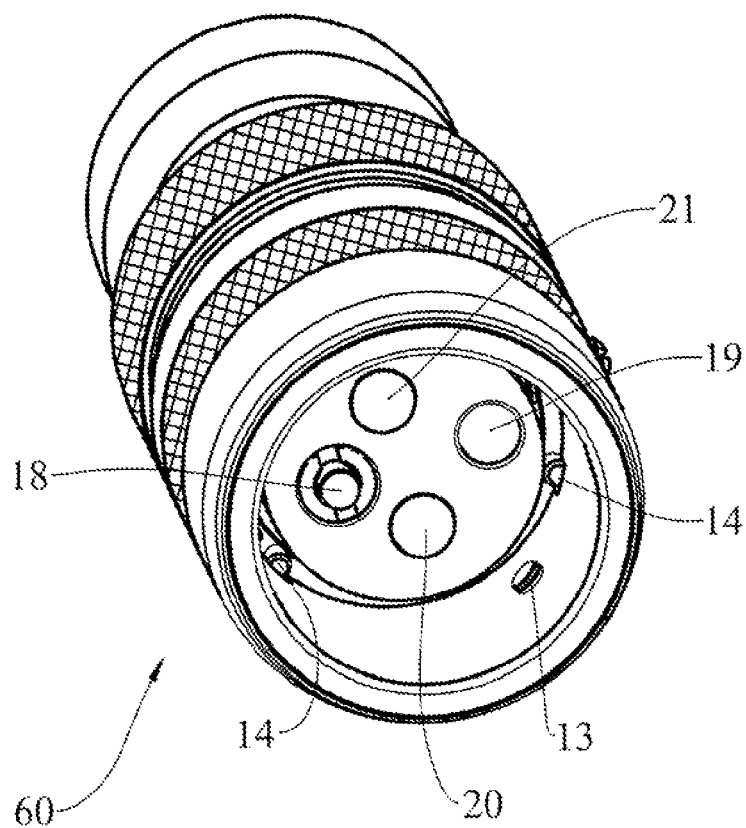
FIG. 5 shows a perspective view of the second element of the coupling.
Figure 6:
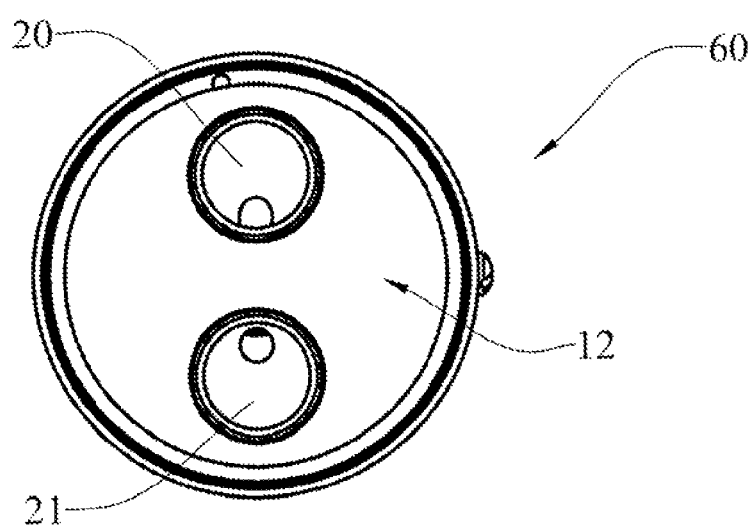
FIG. 6 shows a right-hand view of FIG. 8.
Figure 7:
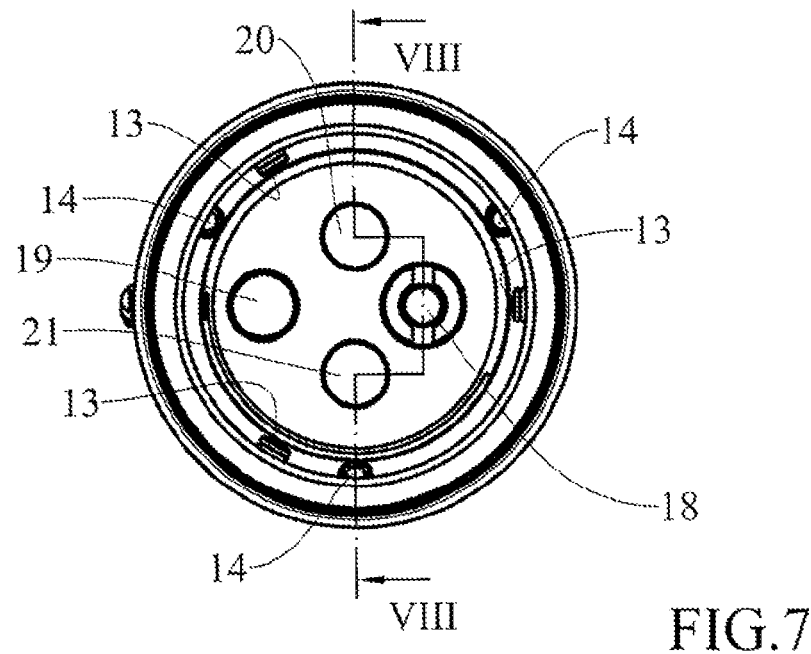
FIG. 7 shows a left-hand view of FIG. 8.
Figure 18:
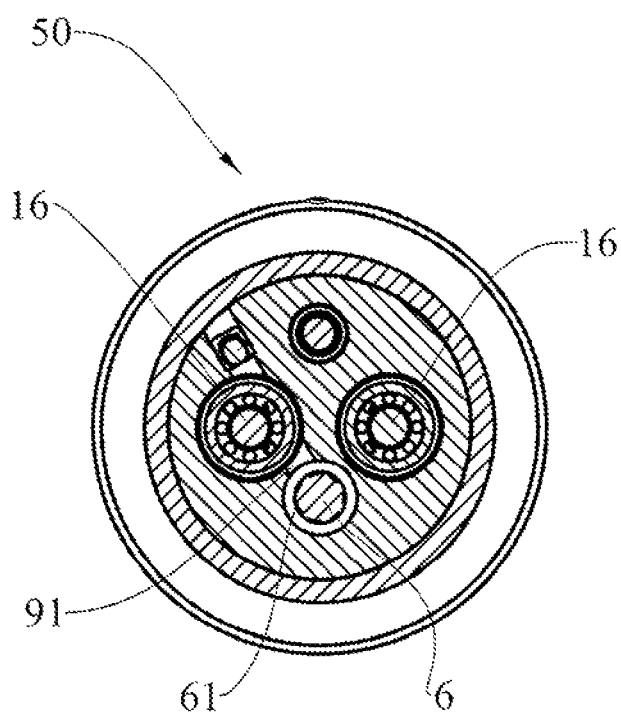
FIG. 18 shows a section view taken along the line XVIII-XVIII in FIG. 17.
Figure 19:
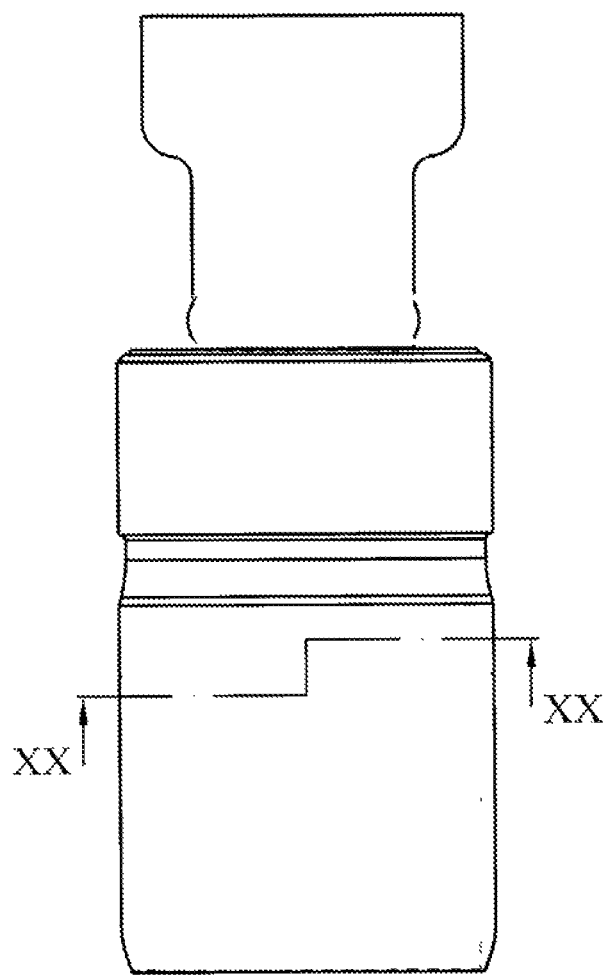
FIG. 19 shows a side view of the second element.

By means of a seal 8, shutter 6 closes an axial hole 61 which is put into communication with the pressure line 9 by means of a channel 91 transversal to the axis (FIGS. 4 and 18).

The guide pin 7 allows the centering with the second element 60 during the step of hooking.

Externally, the second element 60 (FIGS. 5-8) is mainly formed by a hooking ring nut 70, a safety ring nut 11 and a connector 12. The hooking ring nut 70 has three radially fixed pins 13 which allow the second element 60 to couple with the first element 50, by engaging the helicoidal grooves 3 and due the rotation of the ring nut 70.

Three safety pins 14 are fixed in the safety ring nut 11, axially sliding along with the ring nut 11 itself. The safety ring nut 11 is pushed against the hooking ring nut 70 by a compression spring 15.

Internally, the second element 60 is mainly formed by two valved couplings 17 misaligned with each other, a diverting valve 18 and a seat 19 for the guide pin 7.

The valved couplings 17 are inserted one into a pressure line 20 and the other into the exhaust line 21 and serve the function of closing the flow when the coupling is uncoupled and open it when the coupling is coupled.

A diverting valve 18 allows the communication of the pressure line 20 with the exhaust line 21 when the coupling is uncoupled and closes the communication when the coupling is coupled.

Figure 8:
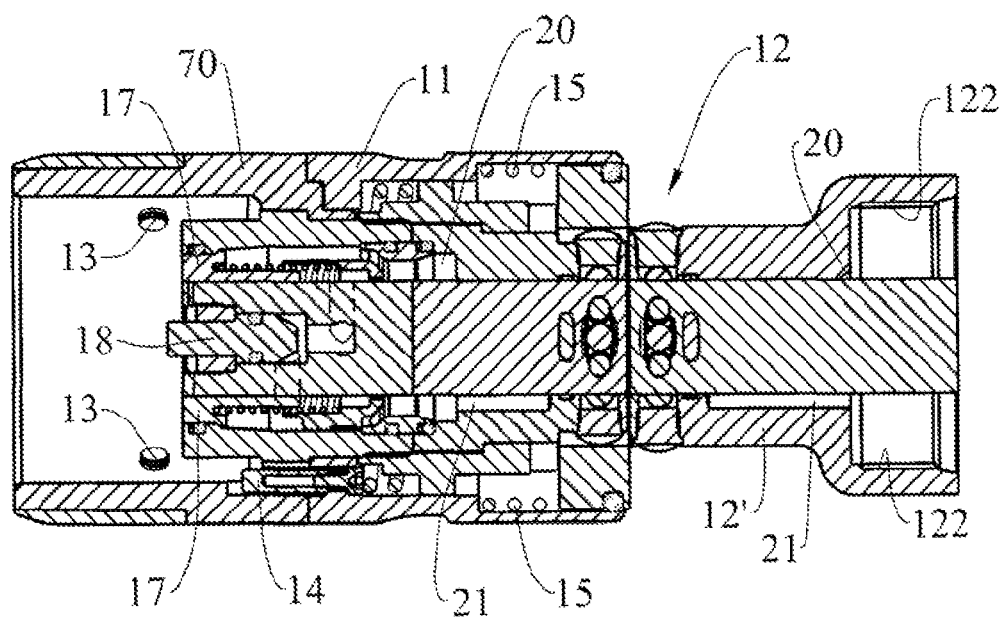
FIG. 8 shows a section view taken along line VIII-VIII in FIG. 7.
Figure 16:
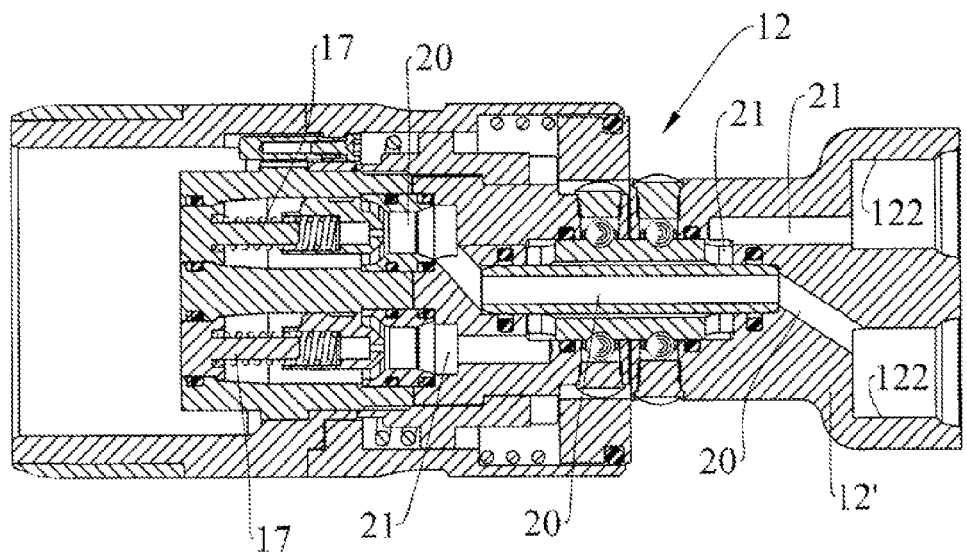
FIG. 16 shows a section view taken along line XVI-XVI in FIG. 15.
Figure 17:
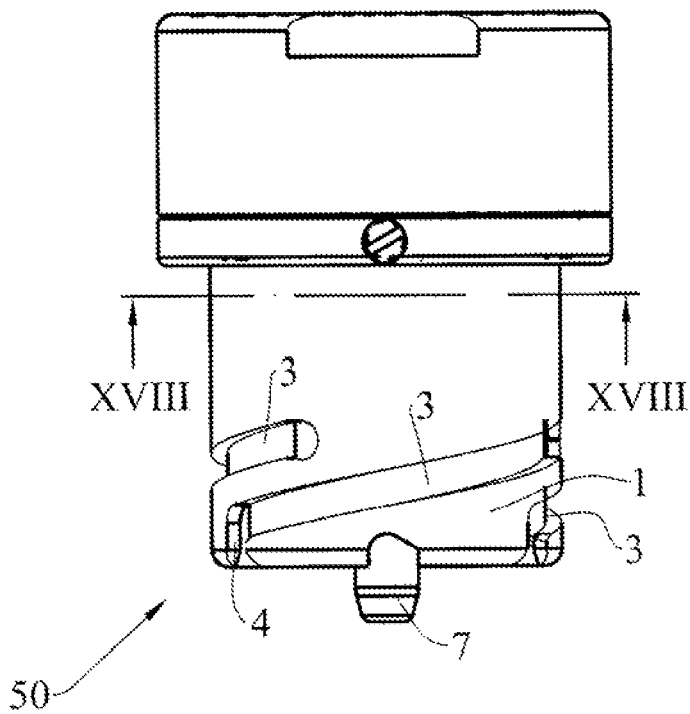
FIG. 17 shows a side view of the first element.
Figure 20:
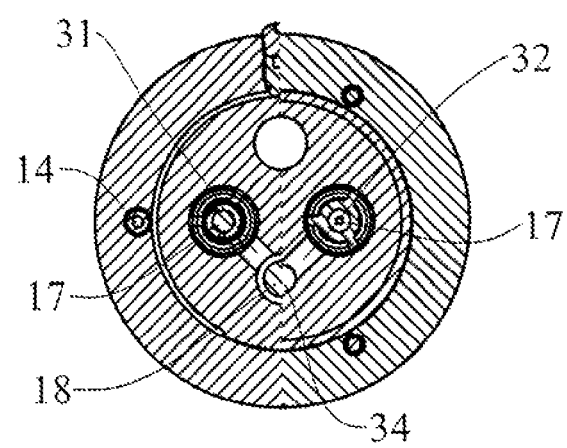
FIG. 20 shows a section view taken along the line XX-XX in FIG. 19.

Connector 12 has two threaded outlets 122 at one end thereof, for users interface (tubes etc.), while the inner part which is connected to the first element 50, has the peculiarity that the two lines 20 and 21 become coaxial (FIGS. 16 and 20), and by a spherical means 16, the rotation of the part 12' of connector 12 connected to the tubes is allowed with respect to the coupling 1 (in FIG. 16, part 12' is shown rotated with respect to FIG. 8). It is worth noting that said rotating part 12' may be also or alternatively provided with the first element 50 in coupling 2.

The seat 19 accommodates the guide pin 7 of the first element 50 thus allowing the centering with the first element 50 during the step of hooking.

In order to couple the coupling (FIGS. 9-12), the external sleeve 1 of the first element 50 is inserted into the hooking ring nut 70 of the second element (FIG. 9), and centering is performed by rotating the two parts until the guide pin 7 enters in its seat 19 while the hooking pins 13 enter in the helicoidal grooves 4. At this point, the first element 50 is driven into the second element 60 (FIG. 10-11) by rotating the hooking ring nut 70.

By touching the safety pins 14, the front part of the external sleeve 1 pushes the safety ring nut 11, thus allowing to continue the rotation of the hooking ring nut 70 until the hooking pins 13 reach the end of travel (end of helicoidal grooves). In this position, the coupling is completed and due to the compression spring 15, the safety pins 14 are pushed into the seats 4 frontally arranged on the external sleeve 1, thus preventing the hooking ring nut 70 from rotating with respect to the external sleeve 1, and thus avoiding the coupling from accidentally unhooking (FIG. 12).

The first element 50 is blocked with the second element 60, while the coaxial rotating connector 12 of the male 60, which could also be placed on the first element 50, by virtue of the spherical means 16, may rotate (FIG. 12) thus avoiding possible twisting of flexible tubes.

Figure 13:
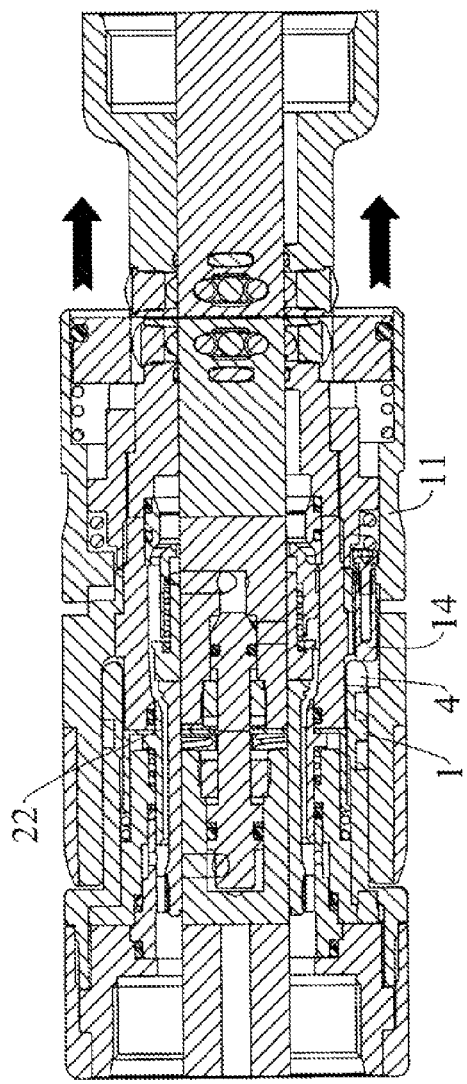
FIG. 13 shows a section view of the first and second elements aligned in a fifth position.
Figure 14:
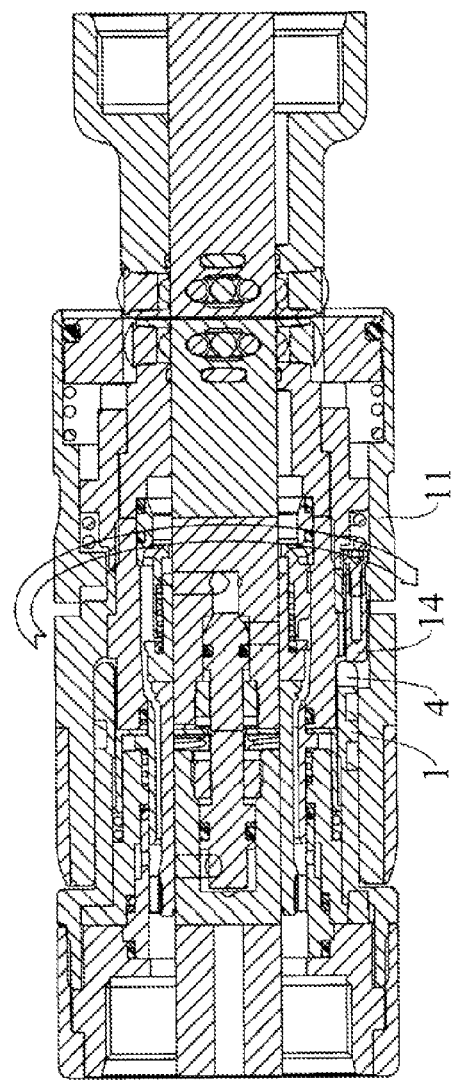
FIG. 14 shows a section view of the first and second elements aligned in a sixth position.
Figure 15:
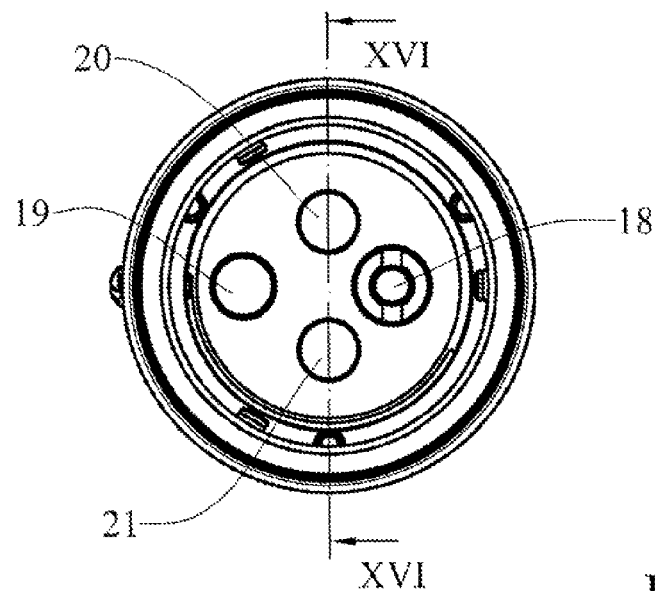
FIG. 15 shows a left-hand view of FIG. 8.

In order to disconnect coupling 1, the safety ring nut 11 needs to be retracted so as to disengage the safety pins 14 from their seats 4 (FIG. 13), and thus rotate in the opposite direction with respect to the coupling (FIG. 14).

On one hand, the front seats 4 of the external sleeve 1 have a shoulder 41 (FIG. 1) so that the pin 14 may not exit during the releasing rotation, while on the other hand, they have an inclined plane 42 to allow the pin 14 to exit during the hooking rotation.

The diverting device of the second element 60 consists of a diverting valve 18, which puts the pressure line 20 into communication with the exhaust line 21 when the coupling is uncoupled by means of the channels 31 and 32, and closes communication when the coupling is coupled.

When the coupling is uncoupled (FIG. 9), the flow which comes from the pressure line 20, due to the hydrostatic push, pushes the valve 18 forward, thus creating the passage in the compartment 34 (FIGS. 9-11, in particular see the enlargement in FIG. 11) of the valve 18 to flow into the exhaust line 21 through the channels 31 and 32 upstream and downstream of said compartment 33. This fluid recirculation prevents the pressure from being generated in the pressure line 20. When coupling, the valve 18 comes into contact with the shutter 6 of the first element 50 (FIG. 10) and is pushed against its seat 33 for closing.

With the valve 18 still open (FIG. 11), the valve of the first element, i.e. a sealing sleeve 22, is first opened thus allowing a possible pressure in the first element 50 to be discharged into the second element 60, and therefore the valve 18 being open to discharge into the exhaust line. When the coupling is completely coupled, the shutter 6 pushes the valve 18 towards the sealing seat 33 thus closing the communication between the pressure line 20 and the exhaust line 21 (enlargement in FIG. 12).

The shutter 6 of the first element 50 has a larger diameter d1 than the diameter d2 of the valve 18, and therefore the hydrostatic push section of the shutter 6 is also greater than that of the valve 18. As a result of this concept, the pressure generates a greater force on the side of shutter 6, which pushes the valve 18 toward the seat 33, thus ensuring sealing.

Figure 21:
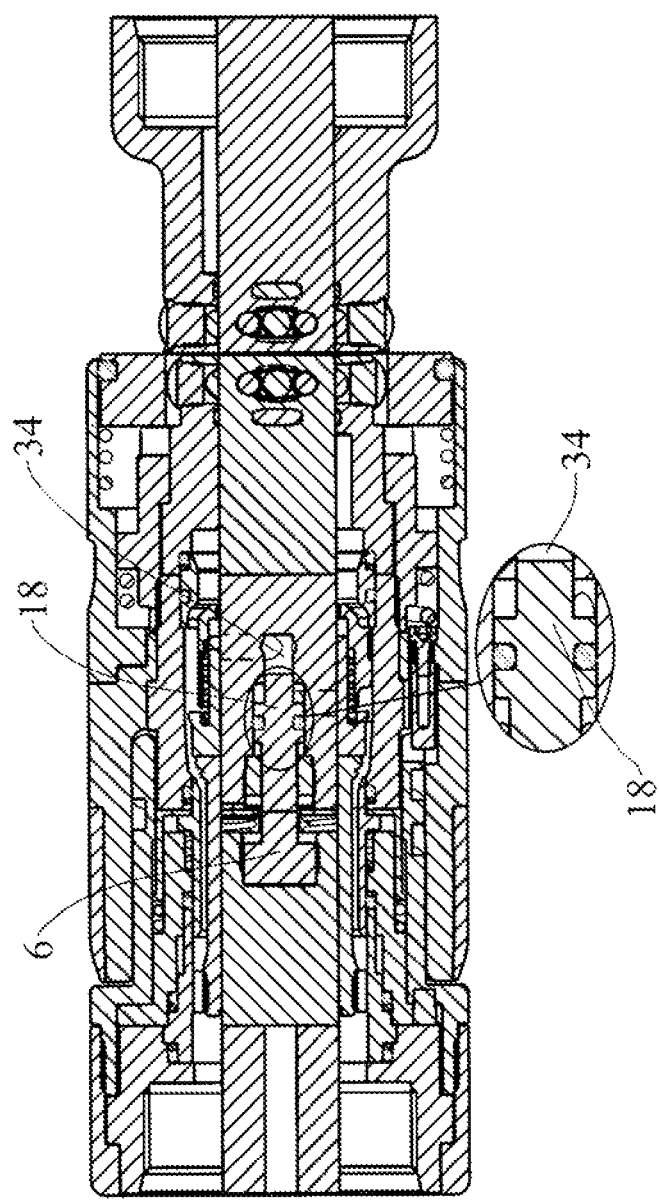
FIG. 21 shows a section view of the coupling with a fixed shutter.

Alternatively, as shown in FIG. 21, a fixed shutter 6 may be included, which in all cases pushes the diverting valve 18 into its seat 33, possibly with a diameter of the valve 18 which precisely fits the compartment 34.

Unhooking the coupling includes a sequence of positions of valve 18 which are reversed as compared to those mentioned above.

The invention claimed is:

1. A quick coupling comprising a first element and a second element that can be separably coupled,
    wherein the first element includes a connector for connecting to a user interface, an external sleeve having helicoidal grooves and seats, and a first valved coupling for a first pressure line,
    wherein the second element includes a hooking ring nut, a plurality of internal pins, a compression spring, a second valved coupling for a second pressure line, and a connector,
    wherein the plurality of internal pins is radially fixed and configured to engage in the helicoidal grooves of the external sleeve for coupling the second elements with the first element,
    wherein said second element further comprises a safety ring nut and plurality of safety pins provided along a circumference of the safety ring nut, the safety pins being configured to axially slide with the safety ring nut, and
    wherein the safety pins are configured to be pushed by the hooking ring nut and the compression spring into the seats of the external sleeves.

2. The quick coupling of claim 1, wherein the seats are disposed at a front of the external sleeve,
    wherein the hooking ring nut is configured such that rotation thereof displaces the first element relative to the second element in the axial direction as the internal pins move in the helicoidal grooves,
    wherein the first element and the second element are configured such that the front part of the external sleeve pushes the safety ring nut to allow rotation of the hooking ring nut to continue until the internal pins reach the end of the helicoidal grooves, and the compression spring pushes the safety pins into the seats of the external sleeve which prevents the hooking ring nut from rotating with respect to the external sleeve.

3. The quick coupling of claim 1, wherein the safety ring nut is configured such that the second element is capable of being disconnected from the first element by displacing the safety ring nut disengage the safety pins from the seats of the external sleeve.

4. The quick coupling of claim 1, wherein the connector of the second element is rotatable relative to the safety ring nut and the hooking ring nut.

5. The quick coupling of claim 2, wherein the safety ring nut is configured such that the second element is capable of being disconnected from the first element by displacing the safety ring nut to disengage the safety pins from the seats of the external sleeve.

6. The quick coupling of claim 2, wherein the connector of the second element is rotatable relative to the safety ring nut and the hooking ring nut.

7. The quick coupling of claim 5, wherein the connector of the second element is rotatable relative to the safety ring nut and the hooking ring nut.

* * * * *